C. E. THOMPSON.
APPARATUS FOR WELDING BY ELECTRICITY.
APPLICATION FILED JUNE 11, 1907.
915,249.
Patented Mar. 16, 1909.
2 SHEETS—SHEET 2.
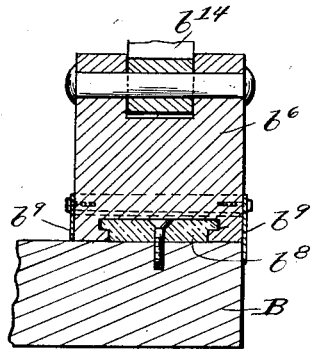
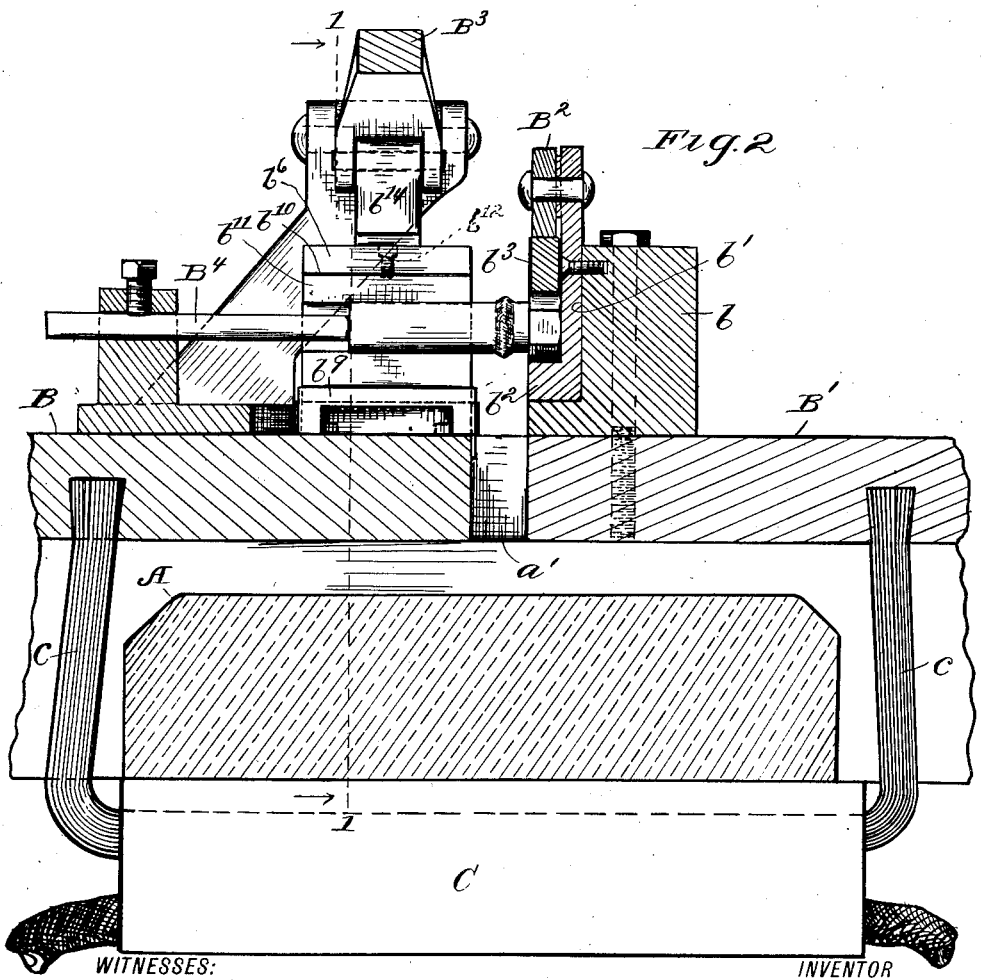
WITNESSES:
E. R. Rodd.
Jno. F. Oberlin
INVENTOR
Charles E. Thompson
BY
J. B. Fay
ATTORNEY

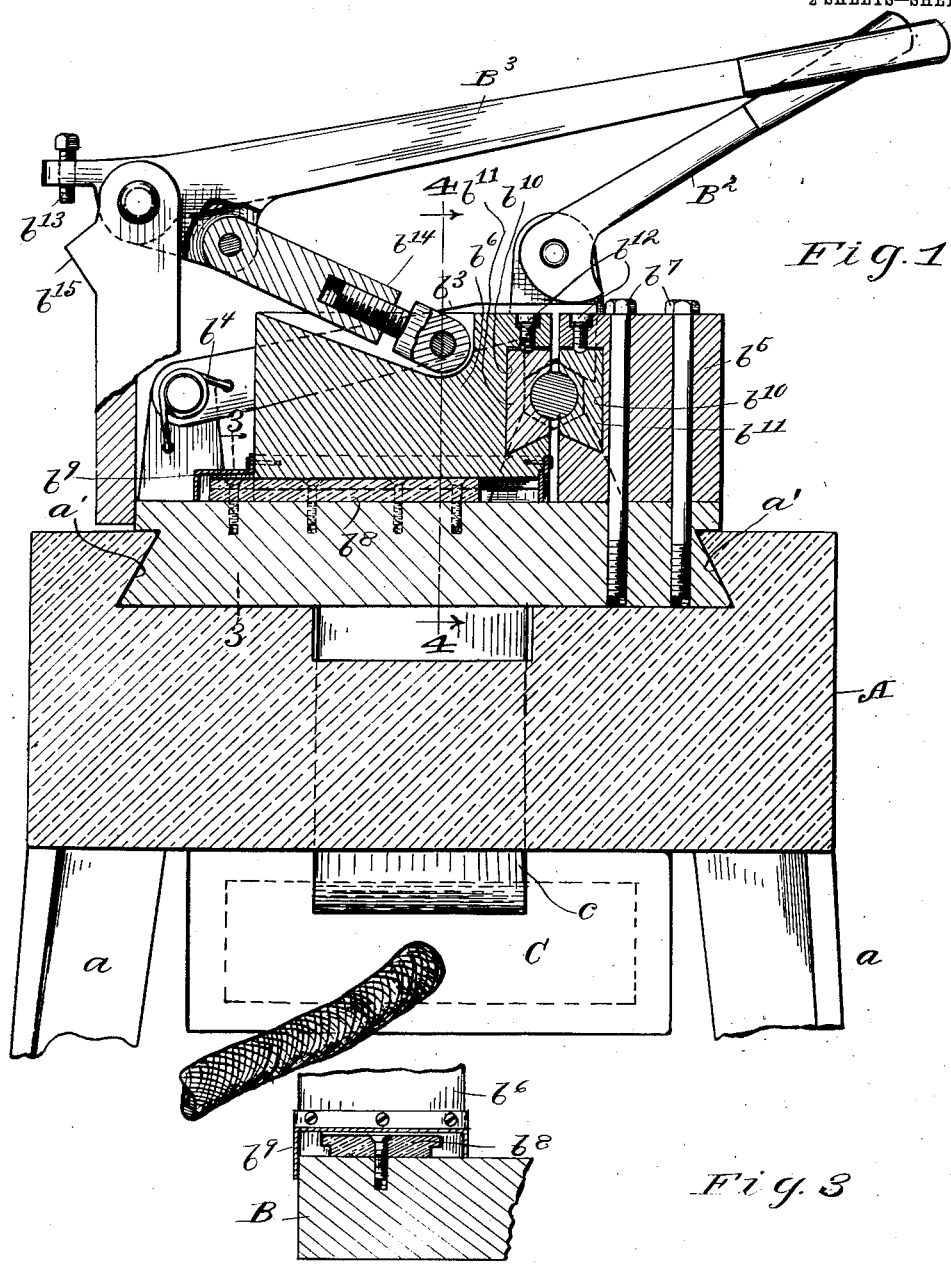

UNITED STATES PATENT OFFICE.

CHARLES E. THOMPSON, OF CLEVELAND, OHIO, ASSIGNOR, BY MESNE ASSIGNMENTS, TO THE ELECTRIC WELDING PRODUCTS COMPANY, OF CLEVELAND, OHIO, A CORPORATION OF OHIO.

APPARATUS FOR WELDING BY ELECTRICITY.

No. 915,249.      Specification of Letters Patent.      Patented March 16, 1909.

Application filed June 11, 1907. Serial No. 378,438.

*To all whom it may concern:*

Be it known that I, CHARLES E. THOMPSON, a citizen of the United States, resident of Cleveland, county of Cuyahoga, State of Ohio, have invented a new and useful Improvement in Apparatus for Welding by Electricity, of which the following is a specification, the principle of the invention being herein explained and the best mode in which I have contemplated applying that principle, so as to distinguish it from other inventions.

My invention relates to apparatus for electrically welding together metal parts, and has as its object the provision of means whereby the heating effect of the current employed is more uniformly applied to the parts of the article being united and a much better weld hence obtained.

To the accomplishment of this and related objects, said invention consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings: Figure 1 is a transverse cross-section, with parts appearing in elevation, of one embodiment of my invention, such embodiment being shown as consisting of an apparatus for welding the heads onto bolts; Fig. 2 is a longitudinal cross section of such apparatus; while Figs. 3 and 4 are transverse cross-sections upon lines 3—3, and 4—4, respectively, Fig. 1, showing details of the construction of such apparatus.

This apparatus, designed for work of the particular character indicated, consists primarily of a machine bed or base A upon which the various parts now to be described are suitably supported, such bed being raised by means of legs $a$ to a suitable height above the floor. Since the parts referred to as being mounted upon the bed require to be insulated one from the other, either the bed must necessarily be made of insulating or non-conducting material or else provision must be made in connection with the mounting of the parts whereby the necessary insulation is secured. The former arrangement is the one contemplated here. Mounted upon the top of machine bed A are the two electrodes B B' that enter directly into the welding operation, such electrodes forming the terminals of the heating electric circuit whereby the welding operation in question is performed. This circuit, while obtained from any suitable source, will ordinarily be provided by the secondary of a transformer C that is conveniently secured to the under side of the machine base. Conductors $c\ c$ serve to connect such transformer with the two electrodes just referred to respectively. While both such electrodes are desirably longitudinally adjustable in suitable slideways therefor provided in the machine bed, in the operative condition of the apparatus one, here shown as B, is ordinarily fixed and the other B' reciprocable with respect to such fixed electrode. Movable electrode B' comprises in addition to the base plate forming the electrode proper, a block $b$ mounted thereon, in the face of which latter is provided a recess $b'$ designed to receive one element $b^2$ of a clamping die. The other element of such die consists simply of the outer end of a pivotally mounted arm $b^3$ that is normally held in a raised position by a spring $b^4$, but which, upon occasion, may be depressed by means of a cam lever $B^2$ to securely clamp between it and the lower die member one of the parts to be joined. Die block $b^2$ is desirably made removable in order that as it becomes necessary to work upon articles of different sizes change may be made to accommodate the clamping mechanism to such different sizes. It has not been thought necessary to illustrate the lever or equivalent means whereby electrode B' is reciprocated.

Electrode B instead of being movable in the machine frame, is fixed as has been stated. However it comprises a base-plate that may be longitudinally adjusted therein as appears in Fig. 1, being mounted in the same slideway $a'$ as the base plate of electrode B'. Upon the upper face of the base-plate of this electrode are mounted two blocks $b^5\ b^6$ relatively movable in a direction transverse with respect to the direction of movement of the base-plate. The fixed block $b^5$ is secured by bolts $b^7$ while the movable block $b^6$ is mounted upon a transversely disposed slide $b^8$. Both fixed block $b^5$ and slide $b^8$ are made of conducting material so as to afford a continuous electrical conductor with the base plate on which they are mounted and the block $b^6$ reciprocably mounted upon said slide $b^8$, has a bearing face in contact with such slide so as to likewise have in effect direct electrical connection with the base plate. To prevent corrosion or other injury to such contacting faces of block $b^6$ and slide $b^8$ the former bears a shield $b^9$ that is adapted to securely inclose said slide $b^8$ irrespective of the position of the block thereon. The contiguous faces of blocks $b^5$ $b^6$ are recessed, the lower edges of the respective recesses $b^{10}$ being undercut, or rabbeted, Fig. 1, so as to be adapted to more readily hold against dislodgment the die blocks $b^{11}$ designed to be received therein. Set screws $b^{12}$ are adapted to firmly lock said die blocks in place. These blocks constitute the clamping elements or dies proper and, as in the case of the clamping members of the fixed electrode, are obviously removable thus permitting the use of the apparatus in the handling of work of different sizes by merely exchanging the die members. Actuation of transversely movable block $b^6$ to clamp the part between such die members is had by means of a lever arm $B^3$ suitably mounted upon a bracket on the rear side of the base plate and connected with the block by means of a toggle link $b^{14}$ of adjustable length as shown. Undue movement of the lever is prevented by means of engagement of a set screw $b^{13}$, borne by its lower end, with a lug $b^{15}$ projecting from the standard just referred to.

Referring for illustrative purposes to the use of the device for the purpose first stated, that of welding parts of bolts or the like together, it may be stated that the head of the bolt is designed to be secured between the clamping dies of the movable electrode B'. The body of the bolt, constituting the other part, is then clamped between the two relatively movable blocks upon the base plate constituting the other, or fixed, electrode. A stop $B^4$ adjustably mounted upon the top of said base plate is adapted to gage the position of the part referred to, as also to prevent endwise movement of the same once it is properly positioned, Fig. 2. Such part being thus clamped, the base-plate or electrode B' is moved toward the fixed electrode and the current simultaneously applied, the flow of such current from the one electrode to the other generating the necessary heat to fuse the contiguous end of the two parts of the bolt. Aside from the structural features characterizing the device, thus described in operation, I desire particularly to call attention to the arrangement of the two blocks whereby the body of the bolt is clamped. Such blocks it has been seen have independent, and direct, electrical connection with the terminals of the heating electric circuit and by clamping the bolt between them from both sides, such current is divided, the divided portions, however, flowing through the latter simultaneously from the two sides in question. As a result of this division of the current, a much more uniform heating effect is obtained than is the case where the bolt is clamped directly on to the platen or reciprocable base-plate.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the class described, an electrode comprising a base plate forming one terminal of the heating electric circuit, a block fixedly mounted upon said plate, a second block mounted upon said plate so as to be movable in a direction transverse with respect to the direction of movement of the latter, and clamping dies removably secured upon the contiguous faces of the respective blocks, said dies being formed to substantially encompass one of the parts to be joined, and both said blocks having approximately equally direct electrical connection with said last-named electrode, whereby a uniform distribution of current is had in such part, substantially as described.

2. In apparatus of the class described, an electrode comprising a base plate forming one terminal of the heating electric circuit; a block fixedly mounted upon said plate; a second block mounted upon said plate so as to be movable in a direction transverse with respect to the direction of movement of the latter, said blocks being respectively provided with recesses on their contiguous faces, clamping dies fitted to said recesses; means for securing said dies in place, said dies being formed to substantially encompass one of the parts to be joined, both said blocks having approximately equally direct electrical connection with said last-named electrode, whereby a uniform distribution of current is had in such part; and means for moving said second block, said means comprising a lever, mounted upon said electrode and a toggle-link connecting said lever with said block, substantially as described.

3. In apparatus of the class described, the combination of a fixed electrode; a second electrode reciprocable toward and away from said first electrode, said electrodes forming the respective terminals of the heating electric circuit; means adapted to clamp one of the parts to be joined to the face of said second electrode disposed toward said first electrode; a block fixedly mounted upon said first electrode, said electrode being provided with a slide adjacent to said block and transversely disposed with respect to said second electrode's direction of movement; and a second block mounted upon said slide and adapted to clamp the other of the parts to be joined against said block, said blocks being formed so as to substantially encompass such part, and both blocks having direct electrical connection with said second electrode, whereby a uniform distribution of current is had in such part, substantially as described.

4. In apparatus of the class described, the combination of a fixed electrode; a second electrode reciprocable toward and away from said first electrode, said electrodes forming the respective terminals of the heating electric circuit; means adapted to clamp one of the parts to be joined to the face of said second electrode disposed toward said first electrode; a block fixedly mounted upon said first electrode, and said electrode being provided with a slide adjacent to said block and transversely disposed with respect to said second electrode's direction of movement; a second block mounted upon said slide and adapted to clamp the other of the parts to be joined against said fixed block; said blocks being formed to substantially encompass such part, and both blocks having direct electrical connection with said second electrode whereby a uniform distribution of current is had in such part; a shield borne by said movable block and adapted at all times to inclose said slide, and means for moving said second block, said means comprising a lever mounted upon said second electrode and a toggle-link connecting said lever with said block.

Signed by me this 24th day of May, 1907.

CHARLES E. THOMPSON.

Attested by:
E. R. RODD,
JNO. F. OBERLIN.